United States Patent [19]

Kaminishi et al.

[11] Patent Number: 5,777,507
[45] Date of Patent: Jul. 7, 1998

[54] RECEIVER AND TRANSCEIVER FOR A DIGITAL SIGNAL OF AN ARBITRARY PATTERN

[75] Inventors: Katsuji Kaminishi, Yokohama; Nobuyuki Itoh, Tokyo, both of Japan

[73] Assignee: Kabushiki Kaisha Toshiba, Kawasaki, Japan

[21] Appl. No.: 625,064

[22] Filed: Mar. 29, 1996

[30] Foreign Application Priority Data

Mar. 31, 1995 [JP] Japan ................................. 7-076287
Nov. 2, 1995 [JP] Japan ................................. 7-285998

[51] Int. Cl.$^6$ ................................. H04L 25/26
[52] U.S. Cl. ................................. 327/514; 327/100; 327/101; 327/103; 327/58; 327/563
[58] Field of Search ................................. 327/514, 515, 327/100, 103, 307, 165, 166, 170, 18, 21, 50, 58, 563, 101

[56] References Cited

U.S. PATENT DOCUMENTS 5,025,456  6/1991  Ota et al. ................................. 375/76
5,386,109  1/1995  Ikeuchi et al. ................................. 327/514

OTHER PUBLICATIONS

Ota et al., "DC–1Gb/s Burst–Mode Compatible Receiver for Optical Bus Applications", Journal of Lightware Technology, 10(2):244–249(1992).

Nishikido et al., Demonstration of multigigabit optical interconnection using offset laser driving for a broadband switching network, OFC/IOOC'93 Technical Digest, pp. 168–169, (1993).

Primary Examiner—Timothy P. Callahan
Assistant Examiner—Dinh T. Le
Attorney, Agent, or Firm—Finnegan, Henderson, Farabow, Garrett & Dunner, L.L.P.

[57] ABSTRACT

An optical receiving circuit comprises a photodetector, a differential transimpedance amplifier, a peak detector, a resistor network circuit and a discriminator. The transimpedance amplifier receives a current pulse converted by the photo-detector and outputs a non-inverting voltage signal and an inverting voltage signal of the same level. A peak detector for detecting a peak value of the non-inverting voltage signal. A resistor network circuit make an additional operations between an output signal from the peak detector and the inverted voltage signal, and between the non-inverting voltage signal and the non-inverting voltage signal, thereby generating two complemental voltage signals, which have the same amplitude and cross each other at a middle point of the amplitude. The discriminator discriminates a crossing potential at which the two complemental voltage signals generated by the resistor network circuit and generates a pulse-shaped signal with a logical level whose state is changed to another logical state at the crossing potential.

25 Claims, 8 Drawing Sheets

RECEIVER AND TRANSCEIVER FOR A DIGITAL SIGNAL OF AN ARBITRARY PATTERN

BACKGROUND OF THE INVENTION

1. Field of the Invention

The present invention relates generally to a device for use in a tranceiver, and more particularly to an optical receiving circuit, an optical tranceiving circuit, an optical receiver module, and an optical data link device for a digital signal of an arbitrary pattern including a burst signal.

2. Description of the Related Art

In recent years, requirements for capacity and rate of transmission data in an information or communication equipment have been increasing with development of multimedia. Accordingly, hightening transmission frequency in electrical interconnections within the equipment or between equipments and increasing the number of interconnections have been serious problems to be solved. Success in an optical communication system clearly indicated the advantage of a technique to transmit a signal of a large capacity at a high speed as an optical signal and proved that the optical transmission, in place of electrical signal transmission, became practical. Utilizing the superior characteristics of optical transmission, optical interconnection technique to solve the above problems of electrical wires has been devised and developed actively.

Unlike data transmitted in optical communication, a signal transmitted through a wire in information equipment is a digital signal of an arbitrary bit pattern containing a DC component and a burst signal of an inconstant mark ratio. It is necessary that an optical interconnection should transmit these signals correctly. In addition, an optical interconnection used in place of an electrical interconnection must be compact, low-power consuming and inexpensive, without use of a peripheral device or circuit for complicated control.

An AC coupled optical receiver used in the conventional optical communication is designed on the assumption that a continuous data signal of a constant mark ratio is input. This assumption is realized additional coding and decoding circuits. In the same conception, some trials are made to introduce coding and decoding circuits in an optical interconnection, so that an optical receiver of the same structure as used in the optical communication can be realized.

Such as optical receiver, however, is disadvantageous in large circuit size, low data transmission efficiency, and increase in internal delay time of data transmission.

Figure 1:
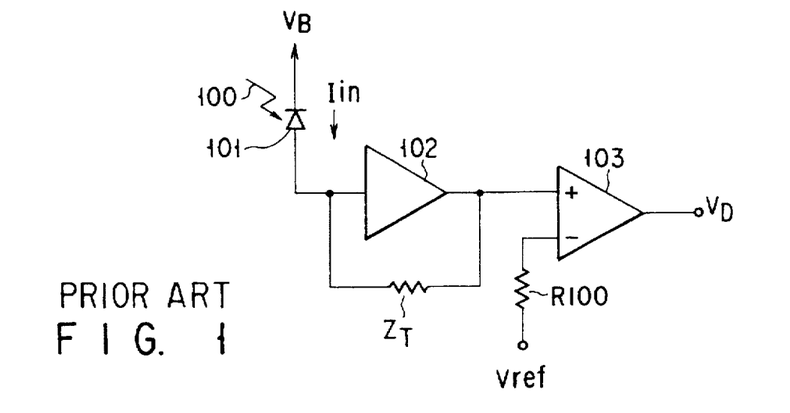
FIG. 1 is a diagram showing a conventional optical receiving circuit.

A DC coupled optical receiving circuit, instead of an AC coupled circuit, is also used in the optical transmission for an uncoded data signal. FIG. 1 shows an example of the conventional DC coupled optical receiving circuit. In FIG. 1, an incident optical signal 100 is converted to a current $I_{in}$ by a pin photodiode (pin-PD) 101, to which a reverse bias voltage VB is applied. The current in is supplied to an input of a transimpedance amplifier 102. A discriminator 103 discriminates an output from the transimpedance amplifier 102, and reproduces an original signal waveform outputs a voltage $V_D$.

In the example shown in FIG. 1, a constant reference voltage $V_{ref}$ is used for a discrimination level in the discriminator 103. Hence, there is a problem that the ratio of the constant discrimination level to the full amplitude of an input waveform is changed in accordance with the change in input pulse amplitude, thereby changing an output pulse

2 width or an error rate of transmission signals. To set an optimal discrimination level, it is necessary that the overall transmission system under actual operation should be adjusted delicately by a hand. In this condition and for a parallel optical interconnection which has many member of wirings, many points must be adjusted in the manual operation. Such an operation is not practical in application of the optical interconnection.

Figure 2:
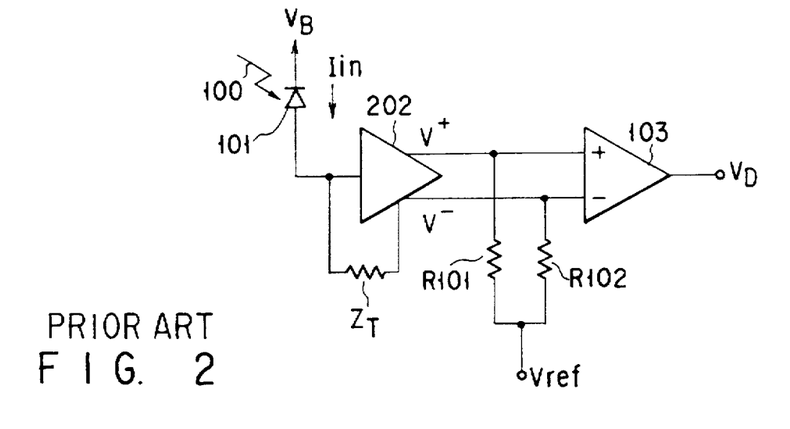
FIG. 2 is a diagram showing another conventional optical receiving circuit.

FIG. 2 shows another optical receiving circuit. In this circuit, since a transimpedance amplifier 202 outputs a differential signal, the discriminator 103 discriminates the level of the differential signal input thereto. In this case, although adjustment of the reference voltage $V_{ref}$ is a little easier than in the case of FIG. 1, the same inherent problem as in the circuit of FIG. 1 is not overcome.

Figure 3:
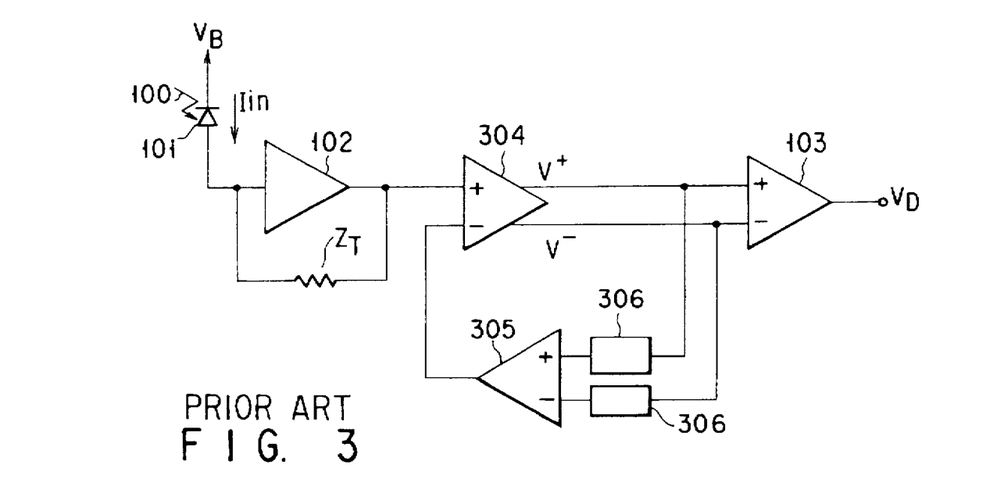
FIG. 3 is a diagram showing still another conventional optical receiving circuit.

To prevent a change in discrimination level or to avoid external adjustment, J. Nishikido et al. has proposed a DC coupled optical receiving circuit in which an optimal discrimination level is automatically generated inside ("Demonstration of Multigigabit Optical Interconnection Using Offset Laser Driving for a Broadband Switching Network", OFC/IOOC '93 Technical Digest, paper ThC3, p. 168, 1993). FIG. 3 shows such an optical receiving circuit. In this circuit, a signal output from a transimpedance amplifier 102 is input to a non inverting input terminal of a differential amplifier 304. Positive peak values of differential output signals $V^+$ and $V^-$ from the differential amplifier 304 are respectively detected by peak value detectors 306 and input to a differential amplifier 305. The differential amplifier 305 amplifies an error so that the difference between the peak values is zero or null. An output from the differential amplifier 305 is fed back to an inverting input terminal of the differential amplifier 304.

Although the circuit shown in FIG. 3 is a DC coupled circuit, it is necessary for a normal operation of the receiver that voltage levels corresponding to logic levels 0 and 1 of the input signal should be holded constantly by the peak detectors 306 respectively. For this purpose one logical level 0 or 1 should be changed to another level at least once while they are holded in the peak detector. In fact, in a transmission system of Nishikido et al. using the aforementioned circuit, the above function is incorporated in a multiplexer and demultplexer circuit. It is therefore impossible to use the optical receiving circuit shown in FIG. 3 to transmit a burst signal.

Further, Y. Ota et al. has proposed an optical receiving circuit which is free from the problems of the circuits shown in FIGS. 1 and 2 and capable of receiving a burst signal ("Burst Mode Digital Data Receiver", U.S. Pat. No. 5,025, 456, Jun. 18, 1991; "DC-1Gb/s Burst Mode Compatible Receiver for Optical Bus Applications", Jour. Digit. Tech. Vol. 10, p 244, 1992).

Figure 4:
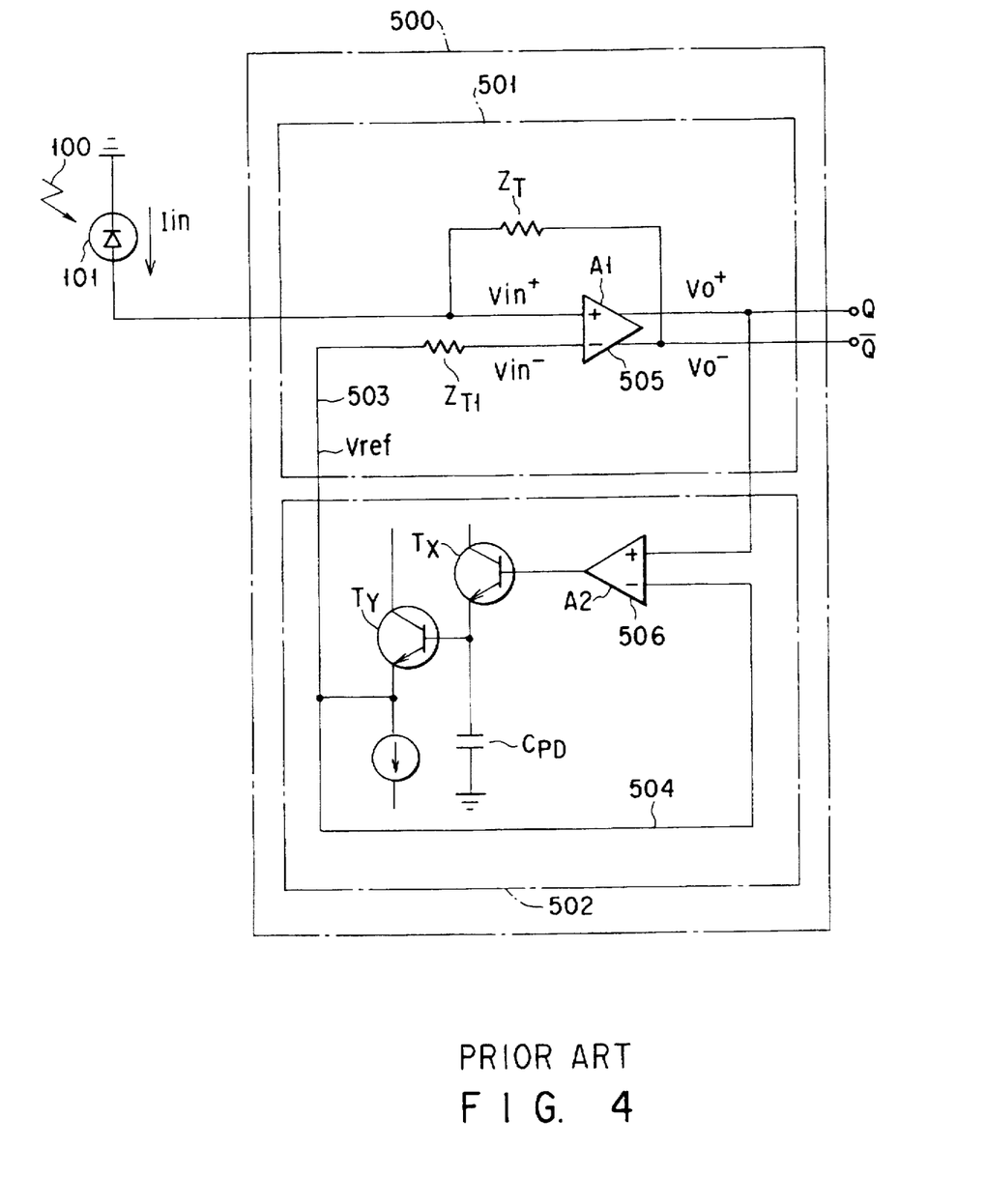
FIG. 4 is a diagram showing still another conventional optical receiving circuit.

FIG. 4 shows such an optical receiving circuit. The optical receiving circuit shown in FIG. 4 comprises a feedback mechanism in which differential signals of received data signals are output, and offset can be automatically adjusted such that output differential signals cross each other at the middle point of the full pulse amplitude. The optical receiving circuit has a basic structure in which a differential transimpedance amplifier 501 and a peak detector 502 are interposed in a negative feedback path. Photocurrent signal is input to a non-inverting input of a differential preamplifier 505. A reference voltage 503 generated in the negative feedback path is input to the inverting input of the differential preamplifier 505. The peak detector 502 for detecting a positive peak value of an output pulse determines the reference voltage 503 by generating a feedback signal to the transimpedance amplifier 501. The peak detector 502 has a function of substantially doubling a transimpedance gain of the circuit shown in FIG. 4, in accordance with the state of an input signal, utilizing the transient characteristics. As a result, a rectangular pulse, discriminated at the middle point of the overall logical amplitude of the input signal, is obtained. Moreover, the entire circuit is constituted by a relatively small number of transistors.

To attain the aforementioned ideal operation, it is important to optimally design a feedback loop, which operates at a high speed, according to the semiconductor IC process. However, it is in fact considerably difficult to design a circuit which performs a desirable operation and which keeps stable in the negative feedback loop. In addition, since a signal is directly fed back to the input circuit, as the level of an input signal is increasing, an input operation voltage also increases. For this reason, the above circuit has a problem that the reverse bias voltage of the pin-PD 101 varies, thereby changing the junction capacitance of the pin-PD 101, with the result that the frequency bandwidth is varied and an operating point change in the internal circuit restricts the dynamic range.

As described above, the conventional DC coupled optical receiving circuit has the problem that the width of an output pulse and the error rate of a transmission signal vary depending on a change in input level. Further, since a number of adjusting points must be operated manually, the circuit is not adapted for practical use.

In another conventional DC coupled optical receiving circuit, the discrimination level is automatically determined to avoid a change in discrimination level or external adjustment. However, such a circuit cannot be used to transmit a burst signal.

In still another conventional DC coupled optical receiving circuit, the discrimination level is automatically generated inside. Although the circuit is capable of transmitting a burst signal, it is difficult to operate the circuit stably and the characteristic and operation of the circuit are greatly influenced by the variance of the input level, because a signal is directly fed back to the input circuit.

As described above, none of the conventional DC coupled optical receiving circuits sufficiently have characteristics indispensable for optical interconnection to realize signal transmission using an optical wave instead of an electrical voltage.

The above matters also apply to a general receiving circuit for discriminating and reproducing an input signal.

SUMMARY OF THE INVENTION

An object of the present invention is to provide, an optical receiving circuit, an optical receiver module, or an optical data link module set, which receives a logical signal data input of an arbitrary pattern, including a burst signal, and discriminate and reproduce the same waveform as the input waveform, irrespective of the amplitude of the input.

In an optical receiving circuit according to the present invention, a light pulse is received by a photodetector, such as a pin-PD, to which a constant reverse bias voltage is applied. The light pulse is converted to a current, which is input to a differential transimpedance amplifier. The differential transimpedance amplifier converts the input current to a voltage signal proportional thereto, and outputs voltage signals of the same inverted and non-inverted levels. The voltage signals of the same level mean voltage signals having the same amplitude in the opposite directions from the non signal level. The non-inverting output signal is input to a peak detector. The peak detector detects a peak value of a non-inverting positive pulse irrespective of the amplitude of an input pulse. The peak detector has a function of detecting a peak value, preferably within the minimum pulse width of transmission data, at most within twice the minimum pulse width. A resistor network circuit is connected between the inverting and non-inverting outputs of the differential amplifier and between the inverting outputs and an output of the peak detector, to add two output voltages. The resistor network circuit outputs a voltage of a waveform having the same level 0 of the non-inverting signal and an amplitude half that of the non-inverting signal. It also outputs, at the same time as initial data signal input, a voltage of a waveform having an amplitude half that of the inverting signal, i.e. the same amplitude for the non-inverting signal and offset to the non-inverting side by that value. In principle, the cross point at which the output waveforms cross each other is the middle point of a rising or falling edge of the overall amplitude of an input logical signal. A differential discriminator discriminates the cross potential and generates a voltage of a pulse-shaped waveform. Thus, it is possible to reproduce a waveform having a discrimination level at the middle point of the amplitude, irrespective of the magnitude of the amplitude of the input light pulse.

For this reason, a logical signal data input of an arbitrary pattern, including a burst signal, can be transmitted with the pulse width thereof holded. Thus, since the circuit of the present invention does not require coding of a transmission signal, it has functions optimal for optical interconnection, i.e. a high data transmission efficiency and short delay time.

In addition, all the circuit blocks constituting the optical receiving circuit are DC coupled. The circuit of the present invention has a relatively simple and small circuit configuration and does not use a complex feedback loop. Therefore, it is easy to design. Moreover, the circuit of the present invention is advantageous in that change in over all characteristic due to a change in the semiconductor process is small.

Further, the transimpedance amplifier is used in a normal manner, such that a voltage does not fed back to the input section. Therefore, the input potential of the amplifier does not change, thereby preventing unexpected restriction of the dynamic range due to the change of the average operating point of the circuit.

By virtue of the above features, when the circuit of the embodiment is used in multi-channel optical interconnection, time skews between transmission signals are small and synchronous interconnection is allowed. Thus, the circuit also has the feature applicable to an optical bus circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Preferred embodiments of the present invention will be described with reference to the drawings.

Figure 5:
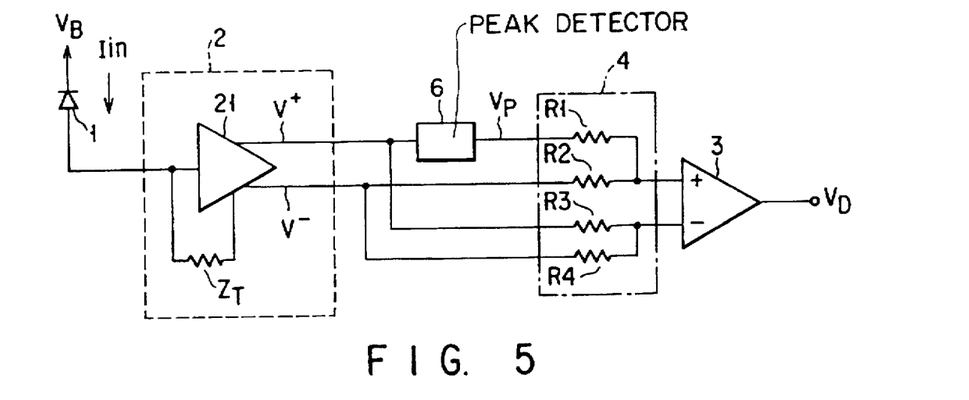
FIG. 5 is a diagram showing the basic structure of an optical receiving circuit according to an embodiment of the present invention.

As shown in FIG. 5, an optical receiving circuit of an embodiment of the present invention comprises: a pin photodiode (pin-PD) 1 for converting an incident light pulse to a current signal; a differential transimpedance amplifier 2 for receiving the current signal and outputting a non-inverting output $V^+$ and a inverting output $V^-$; a peak detector for detecting a peak value of the non-inverting output $V^+$; a resistor network circuit 4 for generating two complementary signals, which have the same amplitude and cross each other at the middle point of a rising or falling edge of the pulse amplitude, based on an output from the peak detector 6, the non-inverting output $V^+$ and the inverting output $V^-$; and a differential discriminator 3 for discriminating a cross potential of the two signals and generating a pulse-shaped waveform.

In this embodiment, the differential transimpedance amplifier 2 comprises a preamplifier (differential preamplifier) 21 and a feedback resistor $Z_T$. The resistor network circuit 4 includes four resistors R1, R2, R3 and R4. The resistor R1 is connected to an output of the peak detector 6. The resistor R2 is connected to the inverting output $V^-$. The resistor R3 is connected to the non-inverting output $V^+$, while the resistor R4 is connected to the inverting output $V^-$. A potential at the connecting node between the resistors R1 and R2 is applied to a non-inverting input terminal of the discriminator 3. A potential at the connecting node between the resistors R3 and R4 is applied to a inverting input terminal of the discriminator 3. To generate the aforementioned two signals which have the same amplitude and cross each other at the middle point of the amplitudes, based on an output from the peak detector 6, the non-inverting output $V^+$ and the inverting output $V^-$, it is necessary that the four resistors R1 to R4 have a fixed relationship. In this embodiment, as will be described later, the resistance values are selected so as to satisfy the following conditions: R1=R2=2Rc, R3=4Rc/3, and R4=4Rc.

In the optical receiving circuit as described above, a reverse bias voltage $V_B$ is applied to the pin-PD 1. When an light pulse is input from a transmission side (not shown), the pin-PD 1 converts the received light pulse to a current in and output the same.

The output current $I_{in}$ is input to the differential transimpedance amplifier 2, which outputs the non-inverting output $V^+$ and the inverting output $V^-$ having the same amplitude. When the output current $I_{in}$ has a value corresponding to the logical "0" (i.e., a value 0 or substantially 0), the non-inverting output $V^+$ has a potential substantially the same as that of the inverting output $V^-$. To be exact, the former potential is lower than the latter by an offset voltage sufficient for generating a voltage level required to make a final logical output $V_D$ equal to the logical output 0. When the output current $I_{in}$ has a non-zero value corresponding to the logical "1", the differential transimpedance amplifier 2 outputs a non-inverting pulse having a predetermined amplitude proportional to the current as the non-inverting output $V^+$ and a invertive pulse having the same amplitude as the inverting output $V^-$.

One of the outputs of the differential transimpedance amplifier 2, i.e., the non-inverting output $V^+$ is input to the peak detector 6, in which a peak voltage value $V_p$ is detected. When the output current $I_{in}$ has a value corresponding to the logical "0", the voltage $V_p$, which is output from the peak detector 6, is as low as the offset voltage.

When the output current $I_{in}$ has a value corresponding to the logical "1", the output $V_p$ from the peak detector 6 rises with a delay of a response time in the peak detector 6. The value of the output becomes equal to the peak value of the pulse, preferably within the minimum pulse width of transmission data, at most within twice the minimum pulse width. A time constant between five times and 1000 times the minimum pulse width is selected as a decay time of the peak value.

The non-inverting output $V^+$ and the inverting output $V^-$ of the transimpedance amplifier 2 and the output $V_p$ of the peak detector 6 are input to the resistor network circuit 4, which is connected, in the next stage, to the discriminator 3 constituted by a differential amplifier. The resistor network circuit 4 executes addition using the three outputs $V^+$, $V^-$ and $V_p$, generates two complementary signals which have the same amplitude and cross each other at the middle point of a rising or falling edge of the amplitude. These signals are supplied to the discriminator 3.

In this embodiment, as shown in FIG. 5, the resistors R1 and R2 are respectively connected to the output $V_p$ and the inverting output $V^-$, while the resistors R3 and R4 are respectively connected to the non-inverting output $V^+$ and the inverting output $V^-$, so that two outputs are added to each other. Preferably, for example, if the resistance values are determined to satisfy the conditions of R1=R2=2Rc, R3=4Rc/3, and R4=4Rc, a voltage $\{(V_p)+(V^-)\}/2$ is generated at the connecting node between the resistors R1 and R2, and a voltage $\{3(V^+)+(V^-)\}/4$ is generated at the connection node between the resistors R3 and R4.

Therefore, the discriminator 3 receives the voltage $\{(V_p)+(V^-)\}/2$ of an output impedance Rc through the non-inverting input terminal, and the voltage $\{3(V^+)+(V^-)\}/4$ of the same impedance through the inverting input terminal. The discriminator 3 discriminates the cross potential of the aforementioned two signals and generates a reproduction signal $V_D$.

Figure 6A:
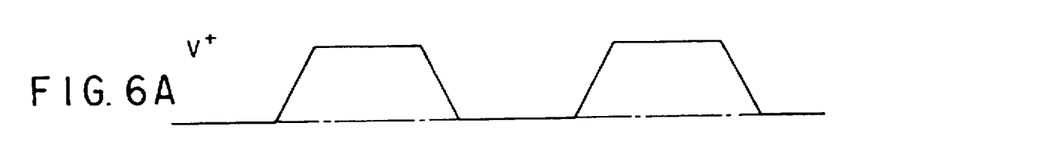
FIGS. 6A to 6E are diagrams showing voltage waveforms of signals in the circuit shown in FIG. 5.
Figure 6B:
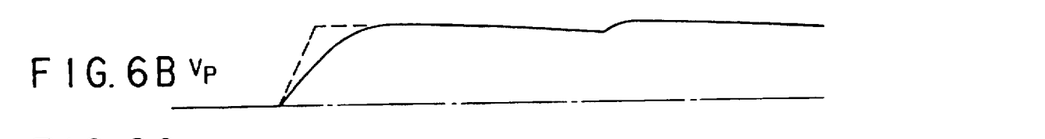
Figure 6C:
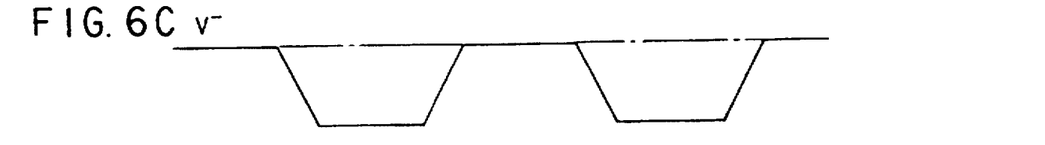
Figure 6D:
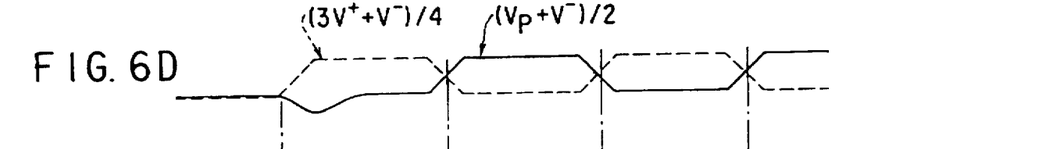
Figure 6E:
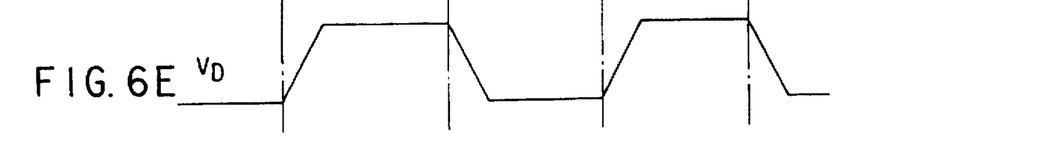

FIGS. 6A to 6E show changes of the voltages. FIG. 6A shows the waveform of the voltage $V^+$, FIG. 6B shows the waveform of the voltage $V_p$, and FIG. 6C shows the waveform of the voltage $V^-$. FIG. 6D shows the waveform of the voltage $\{(V_p)+(V^-)\}/2$ by the solid line and the waveform of the voltage $\{3(V^+)+(V^-)\}/4$ with the broken line. FIG. 6E shows the waveform of the voltage $V_D$ output from the discriminator 3.

As clear from FIG. 6D, the two waveforms of differential input signals input to the discriminator 3 cross each other at the middle point of the amplitude after the trailing edge of the first input pulse. The output voltage $V_D$ is, as shown in FIG. 6E, obtained as an output waveform in which the output logical level is reversed with a delay of the internal response time from the cross reverse of the voltages. Regarding the output voltage $V_D$, the leading edge of the first signal input does not cross the middle point of the pulse amplitude. Except for this case, the output voltage $V_D$ is always discriminated and reproduced at the middle point of the pulse amplitude, independent of the amplitude of an optical data input.

In this embodiment, a relatively simple feedback circuit is used in the block of the optical receiving circuit, and no complex feedback across circuit blocks is executed. The present invention is greatly different in this point from the conventional circuit shown in FIG. 4, in which the reference voltage is fed back at a high speed to the input circuit, although the functions of the circuit blocks used in the present invention and the conventional circuit are similar. Since the circuit of the present invention does not need a complex feedback loop, it is advantageous in that the circuit design is simple and the circuit is influenced little by element characteristics which varies in semiconductor processes.

Further, unlike the conventional circuit shown in FIG. 4, the circuit of this embodiment uses the transimpedance amplifier in a standard manner in which a voltage is not fed back to the input section. Therefore, in general, the input potential of the amplifier does not change, thereby preventing unexpected restriction of the dynamic range due to the change of the average operating point of the circuit.

Moreover, since the circuit of this embodiment has a simple configuration, it is possible to realize a compact and low-power consuming circuit formed on a small chip.

As described above, according to this embodiment, the circuit blocks constituting the optical receiving circuit are all DC-coupled, so that a transmission waveform can be reproduced automatically using the middle point of the pulse amplitude of an input signal as an equivalent discrimination level. For this reason, even when pulse signal data of an arbitrary pattern including a burst signal is input, it can be transmitted with the pulse width maintained. In addition, since a transmission signal need not be coded, data transmission efficiency is high and a delay time is short. Thus, the circuit of the above embodiment has functions optimal for optical interconnection.

Furthermore, the circuit of the above embodiment is easy to design, since the circuit configuration is relatively simple, the size is small, and no complex feedback is employed. In addition, the change in characteristics of the circuit, due to variance in the semiconductor process, is little.

By virtue of the above features, when the circuit of the embodiment is used in multi-channel optical interconnection, time skews between transmission signals are small and synchronous interconnection is allowed. Thus, the circuit also has the feature applicable to an optical bus circuit.

The following are explanations of a detailed circuit configuration of a model, in which the receiving circuit according to the present invention is applied to an IC.

Figure 7:
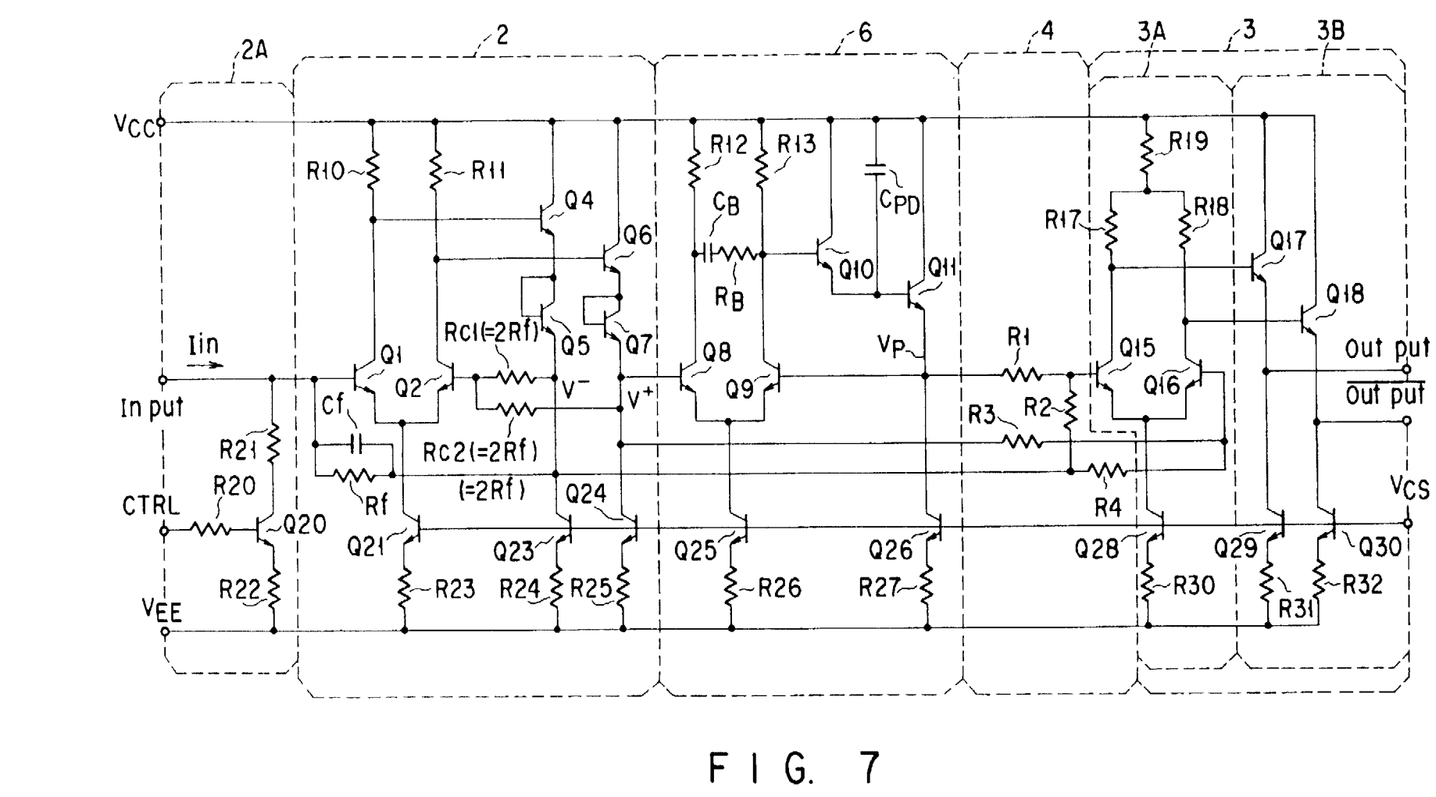
FIG. 7 is a diagram showing a circuit in which the structure shown in FIG. 5 is embodied.
Figure 8:
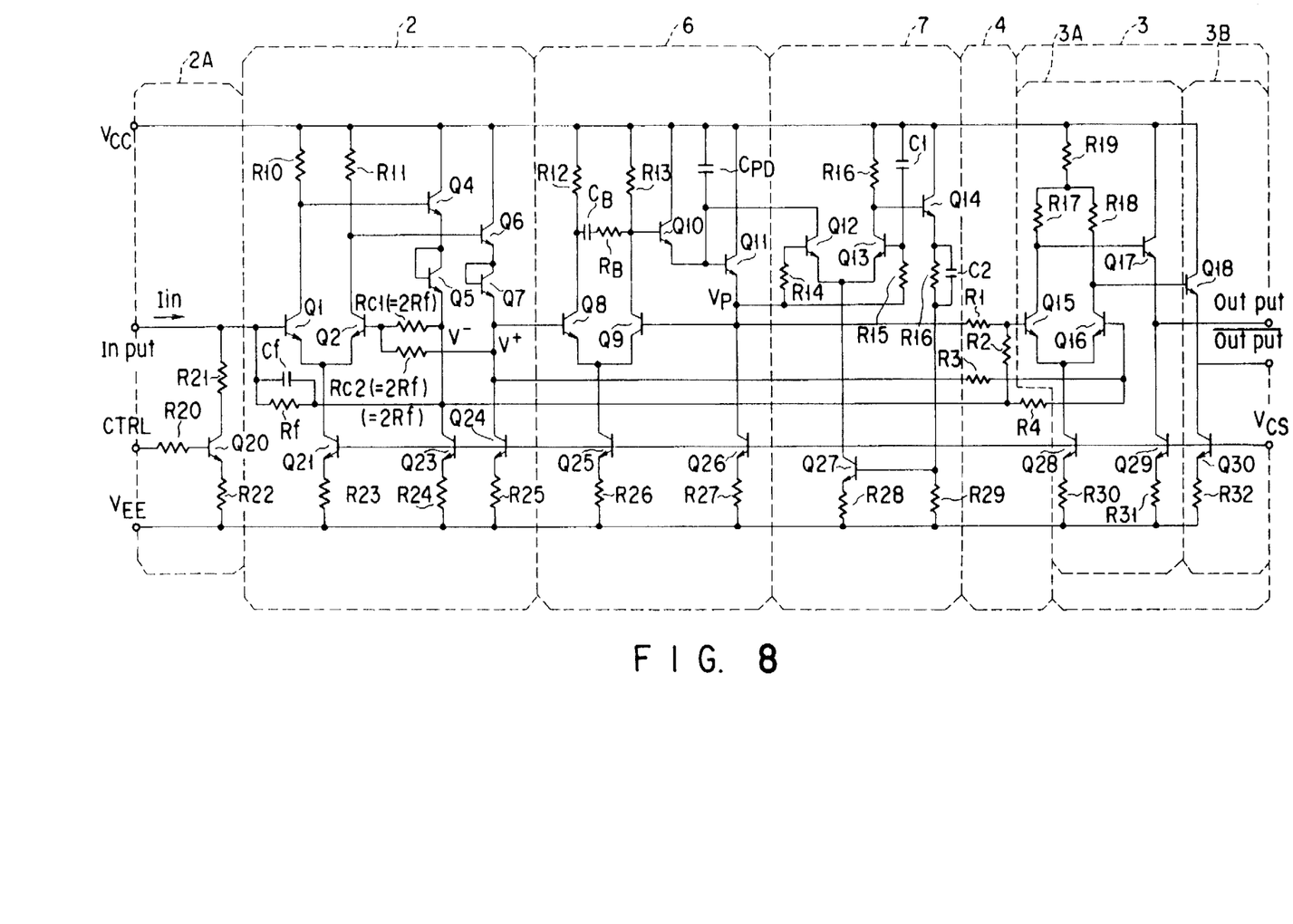
FIG. 8 is a diagram showing an optical receiving circuit according to another embodiment of the present invention.

FIG. 7 is a diagram showing a model in which the circuit shown in FIG. 5 is actually used. FIG. 8 is a diagram showing a circuit in which a damping circuit 7 is added to the peak detector 6 shown in FIG. 5.

In the model shown in FIG. 7, a transimpedance amplifier 2 comprises a differential amplifier including transistors Q1 and Q2, load resistors R10 and R11, a constant current source formed of a transistor Q21, $V_{cs}$ and a resistor R23; an emitter follower including the transistors Q4 to Q7, Q23 and Q24; a feedback resistor Rf and a feedback capacitor Cf. A current output $I_{in}$ of the Pin-PD 1 (not shown in FIG. 7) is input through an input terminal to the base of the transistor Q1.

It is preferable that the average voltage of differential outputs be set as a reference voltage of the inverting input terminal of the differential amplifier. For example, in the circuits shown in FIGS. 7 and 8, the potential of the middle point between the non-inverting output $V^+$ and the inverting output $V^-$ of the two resistors Rc1 and Rc2 (Rc1=Rc2=2Rf) is input to the base of the transistor Q2. Thus, a transimpedance gain, approximate to an ideal value, and a well-balanced differential output can be obtained.

In addition, it is possible to design the circuit so that a voltage about 3V lower than $V_{cc}$ is applied to the input terminal. The voltage can be used as a reverse bias voltage to the Pin-PD 1. The reverse bias voltage, which is constant, allows the Pin-PD1 to operate at a high frequency.

In the above model circuit, a peak detector 6 comprises a differential amplifier including transistors Q8 and Q9, load resistors R12 and R13, a constant current source formed of a transistor Q25, $V_{cs}$ and a resistor R26; an emitter follower including a transistor Q10 serving as a switch and an emitter follower, a voltage maintaining capacitor $C_{PD}$, and transistors Q11 and Q26. The non-inverting output $V^+$ is input to the base of the transistor Q8 of the peak detector 6.

In the peak detector 6, when a non-inverting pulse is input thereto, the transistor Q10 is turned on, and the voltage maintaining capacitor $C_{PD}$ is charged. As a result, the peak value of a pulse is output as a voltage $V_p$. Actually, when the signal input was small due to the transfer delay of the feedback circuit, an overshoot about twice as high as the peak value was observed. When a resistor of several tens to several hundreds Ohms was inserted between the emitter of the transistor Q10 and the voltage maintaining capacitor $C_{PD}$, the overshoot was decreased. However, an optimal value of the resistor was changed depending on the input amplitude.

Figure 9:
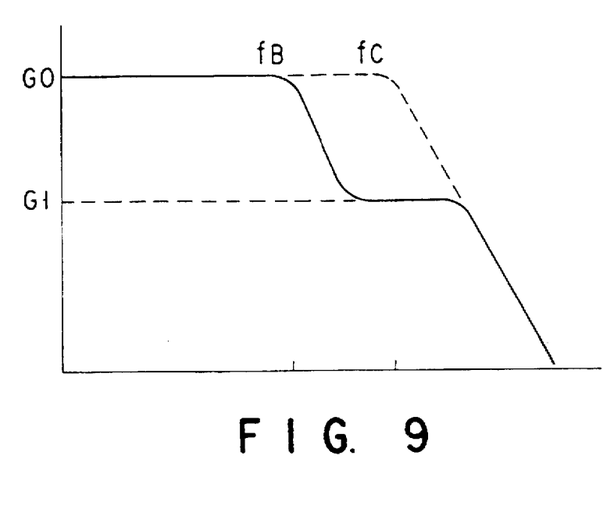
FIG. 9 is a diagram showing a frequency characteristic of an error amplifier circuit in a peak detector.

When the capacitor CB and the resistor RB are connected in series between the resistors R12 and R13, as shown in FIGS. 7 and 8, the gain characteristic of the differential amplifier of the peak detector 6 is changed as indicated by the solid line in FIG. 9. The values of a cutoff frequency fB and a gain G1 can be set arbitrarily by changing the values of the capacitor CB and the resistor RB. When the values of the gain G1 and the cutoff frequency fB were optimized, the rising time with respect to the change of the input could be constant. The optimal values were G1=G0/2-G0/4 and fB=fC/2-fC/5, although they varied depending on the IC process.

As described above, the gain of the negative feedback amplifier of the peak detector 6 has a two-stage roll-off characteristic. As a result, the dynamic range of the peak detector is wider relative to the amplitude. To increase the gain GO of the feedback amplifier, it is possible to modify the circuit such that the resistor R12 is set to zero. In this case, however, it should be noted that the offset voltage of the output is changed and that the optimal values of the capacitor CB and the resistor RB are changed. It is also possible that the capacitor CB and the resistor RB are not connected.

In general, the dynamic range required for the peak detector 6 is assured by the circuit configuration as shown in FIG. 7. To obtain a wider dynamic range, a circuit configuration as shown in FIG. 8 including a damping circuit 7, is effective.

After the peak detector 6 is designed in the manner as described above in principle, the size of the transistor Q10 is increased twofold to fourfold. As a result, the output of the peak detector 6 tends to have an overshoot, irrespective of the input. The damping circuit detects and amplifies a transient response of the signal output from the peak detector, having an overshoot, by means of the differential amplifier including resistors R14 and R15, a capacitor C1 and transistors Q12 and Q13. The differential amplifier, including the transistors Q12 and Q13, supplies a transient signal voltage generated by a load resistor R16 through an emitter follower formed of a transistor Q14 and resistors R16 and R19 to the base of a current generating transistor Q27 for generating a current supplied to the common emitter of the transistors Q12 and Q13. Thus, the damping circuit as a whole serves as a feedback amplifier.

In general, when a transient signal is not input, a biasing current to the common emitter is 100 µA or less. The circuit constant of the feedback amplifier is determined such that the value of the bias current is as small as possible in a range to maintain the band width required for the amplifier circuit. At the same time, the collector of the transistor Q12 is connected to the peak voltage maintaining capacitor $C_{PD}$. The optimal circuit values are determined such that a maximum peak current of the mili ampere order flows only while a positive transient response is input and the overshoot of the peak detector is immediately reduced.

As described above, the damping circuit 7 for suppressing the overshoot due to a transient response is added in the stage subsequent to the peak detector. With this structure, the peak detector 6 operates more accurately in a wider dynamic range, even when a transient response is input. In this case, however, since a high speed feedback damping circuit must be optimized and the performances of the transistors are influenced, a little process dependency exists.

The ideal relationship among the values of the resistors R1 to R4, for executing addition of the non-inverting output $V^+$, the peak output $V_p$ and the inverting output $V^-$ is as described above. The ideal values were allowable to the actual design in many cases. However, for better characteristics, since the differential signal amplitudes and waveforms were somewhat imbalanced, the resistor values were slightly changed. This also contributes to correcting the differential imbalance on the gain and the offset of other internal circuits.

The above circuit model further comprises a differential amplifier including transistors Q15 and Q16, load resistors R17 and R18, a common resistor R19, and a constant current source formed of a transistor Q28, $V_{cs}$ and a resistor R30. The differential amplifier is designed as a limiter amplifier.

An output of the differential amplifier is output through an emitter follower pulled down by constant current sources constituted by transistors Q17, Q18, Q29 and Q30, $V_{cs}$, resistors R31 and R32. The differential amplifier and an output circuit in the subsequent stage are combined, thereby forming a discriminator 3.

A transistor Q20 connected to the input section controls the offset value better the inverting and non-inverting outputs $V^+$ and $V^-$ by means of a control signal CTRL.

With this circuit model, the circuit is compact and consumes lower power, and the chip size can be small. In addition, it is easy to form the circuit in an array, so that they can be utilized in a multi-channel optical receiver. It is clear that the circuit is applicable to a receiver for an optical inter-connection.

Figure 10:
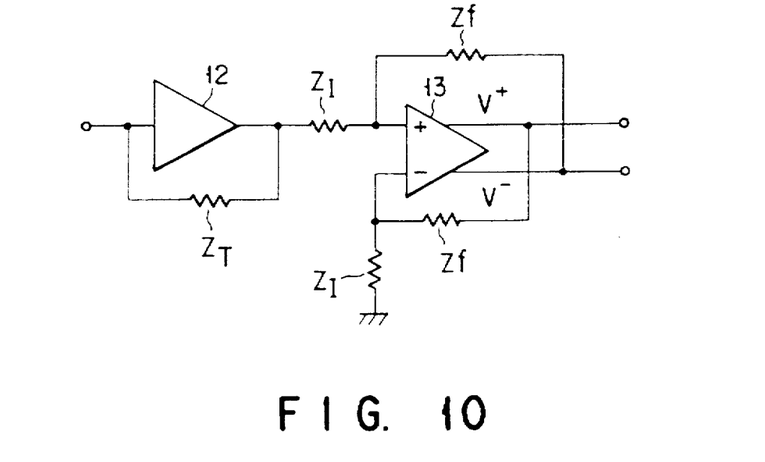
FIG. 10 is a diagram showing a modification of a differential transimpedance circuit.
Figure 11:
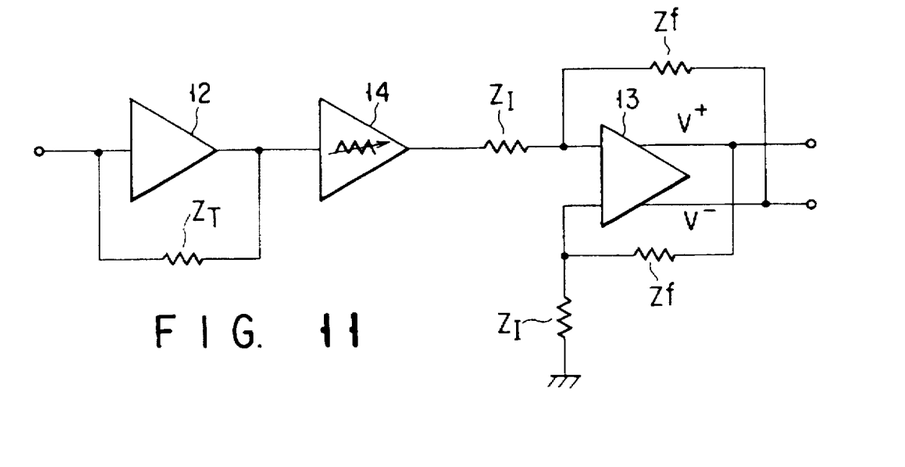
FIG. 11 is a diagram showing another modification of a differential transimpedance circuit.

A modification of the differential transimpedance amplifier 2 shown in FIGS. 5, 7 and 8 will be described. FIG. 10 shows a combination of a single-ended transimpedance amplifier 12 and a differential amplifier 13, instead of the differential transimpedance amplifier 2. FIG. 11 shows a combination of a single-ended transimpedance amplifier 12, a variable gain circuit 14 and a differential amplifier 13, instead of the differential transimpedance amplifier 2. The variable gain circuit 14 is inserted between the transimpedance amplifier 12 and the differential amplifier 13 shown in FIG. 10 to increase the dynamic range of an input.

The optical receiving circuit of this embodiment has been described above. In the following, examples of the device to which the optical receiving circuit is applied, i.e., an optical receiver module and an optical data link device (optical interconnection module set).

(First Applied Embodiment)

Figure 12:
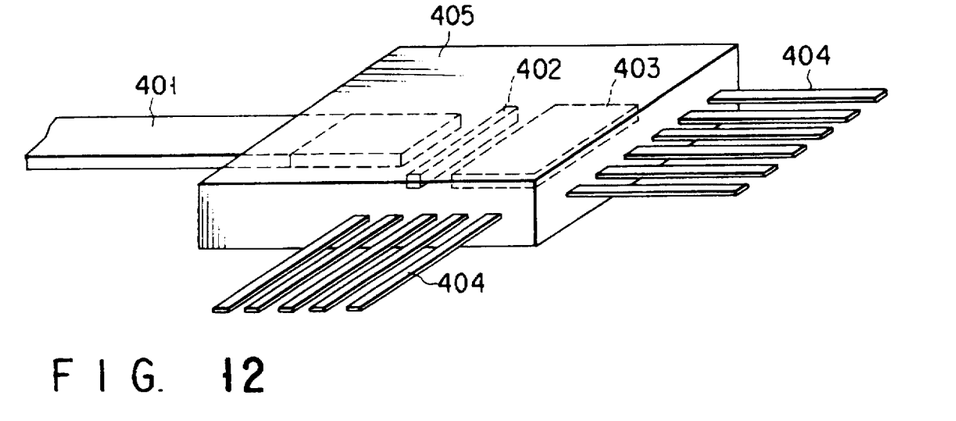
FIG. 12 is a perspective view of a first applied embodiment of the present invention, i.e., an optical receiving module.

A first applied embodiment shown in FIG. 12 is an optical receiver module, in which an optical receiving circuit IC 403, corresponding to the aforementioned optical receiving circuit shown in FIGS. 7 or 8, is hermetically sealed into a package 405. More specifically, all the circuit blocks, except for the Pin-PD, of the optical receiving circuit shown in FIGS. 7 and 8, are integrated in a single chip IC (the optical receiving circuit IC 403). The optical receiving circuit IC 403 is mounted in the package 405 together with a Pin-PD array 402. Thus, an hermetically sealed module is produced. An optical fiber ribbon 401 and electrical leads 404 are drawn out of the package 405. Light is input to the optical receiver module through a pigtail of the fiber ribbon. It was confirmed that an optical receiver module of 1, 4, 6, 8, 10 or 12 channels can transmit data having a waveform of an arbitrary pattern. The optical receiver module of this embodiment is more advantageous as compared to the conventional module in size and cost. If optical coupling between the module and the fiber is made by a lens, instead of the pigtail, the same advantages can be obtained.

(Second Applied Embodiment)

Figure 13:
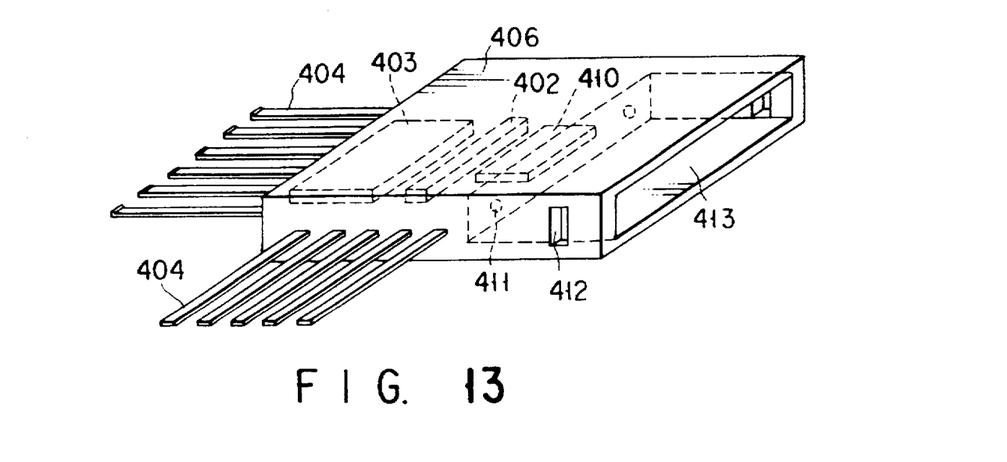
FIG. 13 is a perspective view of a second applied embodiment of the present invention, i.e., an optical receiving module.

A second applied embodiment is an optical receiver module including a package 406 having an optical input section to which an optical connector (not shown) can be connected. The package 406 of the optical receiver module, as shown in FIG. 13, includes the optical receiving circuit IC 403 in which all the circuit blocks, except for the Pin-PD, of the optical receiving circuit shown in FIGS. 7 and 8, are integrated. It also includes a pin-PD 402 and an optical waveguide array 410. A connector inserting port 413 is formed at an end of the receiver package 406, in which an optical connector (not shown) is connected. Inside the connector inserting port 413, a connector guiding pin hole 411 and a connector lock hole 412 are formed. Leads 404 are drawn out of the package 406.

This embodiment has a receptacle-lock structure; however, it may have a plug-lock structure in contrast. Further, it is possible to employ a structure in which a guide pin has been inserted in and fixed to a hole 411, instead of using the connector guiding pin hole 411.

As shown in FIG. 13, when the optical receiver of this embodiment is mounted as a receiver module in an optical data link device, a damage of the optical fiber due to the pigtail input is prevented, and a light pulse can be input to the data link device through the optical connector, so that the optical receiver module can be automatically mountable. In addition to the above advantage in manufacturing the device, it is easy to maintain the device in which the module is used.

(Third Applied Embodiment)

Figure 14:
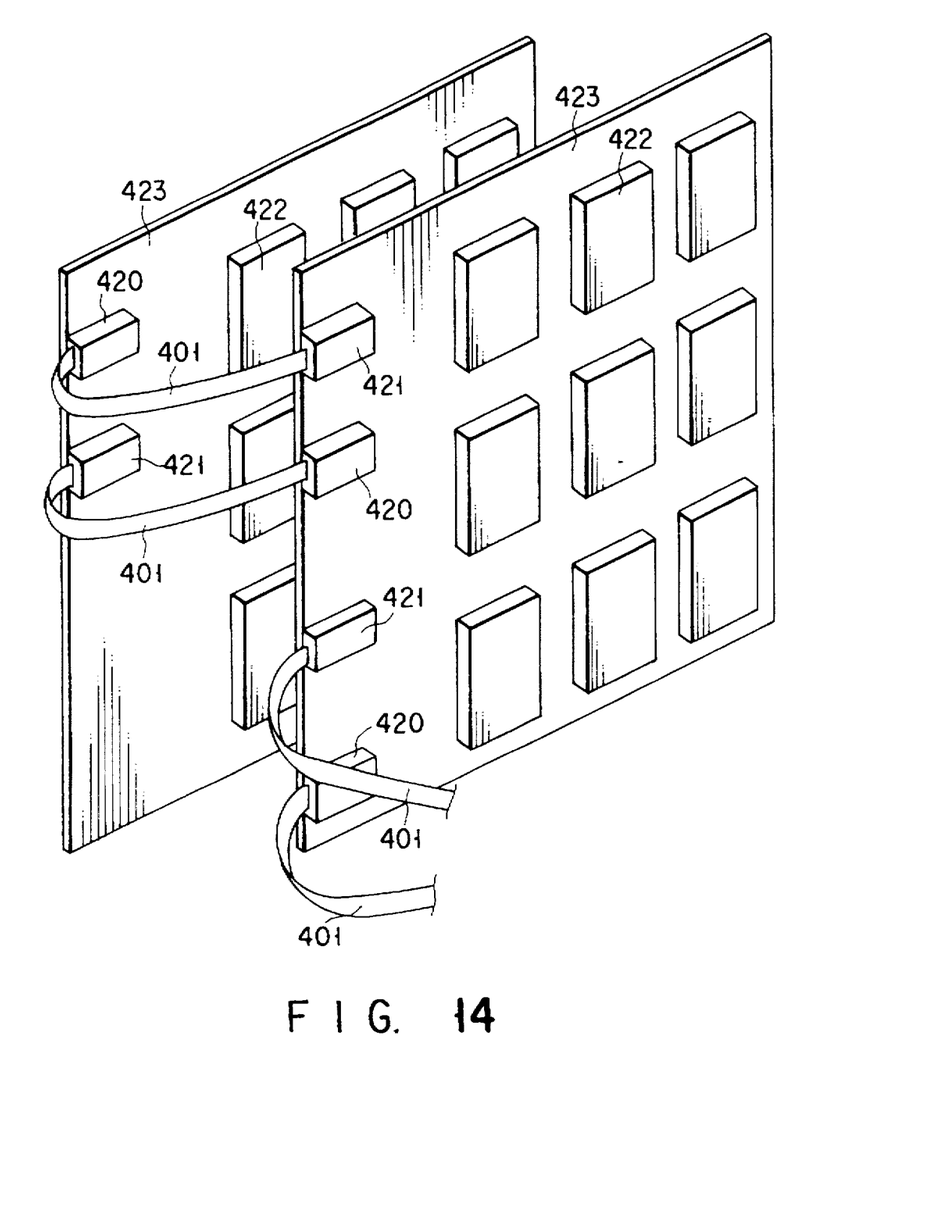
FIG. 14 is a perspective view of a second applied embodiment of the present invention, i.e., an optical data link device.

A third applied embodiment is an optical data link device, as shown in FIG. 14. The optical data link device is connected to an optical receiver module 420, like the modules as shown in FIGS. 12 and 13, and an optical transmitter module 421 for transmitting optical digital signals through an optical fiber cable or an optical fiber ribbon 401. The optical receiver module 420 and the optical tranceiver module 421 are mounted on a print circuit board 423 on which a signal processing IC's is mounted.

The optical data link device can be used to connect boards or devices of optical communication equipment, and also to transmit data of a waveform of an arbitrary pattern. Therefore, an optical interconnection module set, for use in data connection in relation to computers, is realized. The optical interconnection module set satisfies requirements for the specification of optical interconnection in respect of not only electrical functions but also size, cost and power consumption.

In the above embodiments, Si bipolar transistors are used in the receiving circuit. However, the transistors may be replaced with active elements such as MOSFETs, GaAs MESFETs, GaAs HBTs, InP HEMTs, and InP HBTs. Further, in the above embodiments, the pin-PD is used as an photo-detector. However, an APD, an MSM photo-detector or a photo-transistor can be used instead.

Furthermore, in the above embodiments, the photodiode for converting an incident light pulse to a current signal is connected to a stage previous to the differential transimpedance amplifier 2. However, the present invention is not limited to an optical receiver, but is applicable to, for example, a receiving circuit in a transmitting and receiving system, in which a current signal as a pulse signal is input to the differential transimpedance amplifier and discriminated and reproduced, even if the receiver circuit does not have a pin photodiode.

The present invention is not limited to a process of receiving light pulse, but is applicable to a process of receiving X-ray signals, atomic or molecular beam signals, pressure signals, radio frequency or micro-wave signals, magnetic field signals, and PH (ion) signals.

Moreover, the present invention is applicable to a receiving circuit in a transmitting and receiving system, in which a voltage pulse signal, not a current signal, is input to the receiving circuit. In this case, it is only necessary that the differential transimpedance amplifier, for converting a current to a voltage, is replaced by a differential amplifier which receives a voltage signal outputs inverting and non-inverting voltage signals.

In any one of the above cases, it is possible to obtain a receiving circuit, which is resistant to level change in a signal to discriminate, simple and easy to design, and which discriminates a burst signal and operates stably.

As has been described above, according to the present invention, the middle point of the amplitude of an input waveform pulse is automatically discriminated, so that the same waveform as the input waveform can be reproduced in respect of logical signal data input of an arbitrary pattern including a burst signal, irrespective of the magnitude of the amplitude.

In addition, the present invention is advantageous in that the circuit is small in size and relatively simple in configuration, that the circuit is easy to design, since no complex feedback is employed, and that the variance in characteristics due to variance in the semiconductor process is small. Therefore, the present invention allows low cost manufacturing and production of a multi-channel optical receiver.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical receiving circuit comprising:
   a photo-detector for converting a received light pulse to a current pulse;
   a transimpedance amplifier, which receives the current pulse input converted by the photo-detector, for outputting a non-inverting voltage signal and an inverting voltage signal of the same amplitude;
   a peak detector connected to the transimpedance amplifier for detecting a peak value of the non-inverting voltage signal from the transimpedance amplifier;
   a voltage signal generating circuit for generating two complemental voltage signals in accordance with an output signal from the peak detector and the inverting voltage signal and the non-inverting voltage signal from the transimpedance amplified, the two complemental voltage signals each having a same amplitude and a cross point defined at halves of raising and falling edges of the two complemental voltage signals and shared by the two complemental voltage signals; and
   a discriminator for discriminating a potential of the cross point of the two complemental voltage signals and generating a square pulse signal with a logical level whose state is changed to another logical state in accordance with the potential of the cross point.

2. The optical receiving circuit according to claim 1, wherein the transimpedance amplifier comprise a differential transimpedance amplifier.

3. The optical receiving circuit according to claim 2, wherein the differential transimpedance amplifier comprises a differential amplifier having a non-inverting input terminal, an inverting input terminal and output terminals, the non-inverting input terminal inputting a reference voltage being determined by an average the values of the inverting voltage signal and the non-inverting voltage signal output from the output terminals.

4. The optical receiving circuit according to claim 1, wherein the transimpedance amplifier comprise a combination of a single-ended transimpedance amplifier and a differential amplifier.

5. The optical receiving circuit according to claim 4, wherein the differential amplifier has a non-inverting input terminal, an inverting input terminal and output terminals, the non-inverting input terminal inputting a reference voltage determined by an average the values of the inverting voltage signal and the non-inverting voltage signal output from the output terminals.

6. The optical receiving circuit according to claim 4, further comprising a variable gain circuit, provided between the single-ended transimpedance amplifier and the differential amplifier, for adjusting a proper amplitude of an output from the single-ended transimpedance amplifier.

7. The optical receiving circuit according to claim 1, wherein the peak detector comprises an error amplifier having a two-stage roll-off frequency characteristic for negative feedback.

8. The optical receiving circuit according to claim 1, wherein the peak detector comprises a damping circuit for suppressing an overshoot in a transient response in a peak detecting operation.

9. The optical receiving circuit according to claim 1, wherein the voltage signal generating circuit comprises first to fourth resistors respectively having resistances R1, R2, R3 and R4, having a relationship 2R1=2R2=3R3=R4R.

10. The optical receiving circuit according to claim 1, further comprising an offset current adjusting circuit provided between the photo-detector output and the transimpedance amplifier input.

11. The optical receiving circuit according to claim 1, wherein the discriminator comprises a limiter amplifier and emitter followers.

12. An optical receiver module comprising:

an optical receiving circuit; and a package in which the optical receiving circuit is hermetically sealed, wherein said circuit includes,
 a photo-detector for converting a received light pulse to a current pulse,
 a transimpedance amplifier, which receives the current pulse input converted by the photo-detector, for outputting a non-inverting voltage signal and an inverting voltage signal of the same amplitude.
 a peak detector connected to the transimpedance amplifier, for detecting a peak value of the non-inverting voltage signal from the transimpedance amplifier,
 a voltage signal generating circuit for generating two complemental voltage signals in accordance with an output signal from the peak detector and the inverting voltage signal and the non-inverting voltage signal from the transimpedance amplifier, the two complemental voltage signals each having a same amplitude and a cross point defined at halves of raising and falling edges of the two complemental voltage signals and shared by the two complemental voltage signals, and
 a discriminator for discriminating a potential of the cross point of the two complemental voltage signals and generating a square pulse signal with a logical level whose state is changed to another logical state in accordance with the potential of the cross point.

13. An optical receiver module comprising:

an optical input unit including an optical receiving circuit; and
an optical connector provided in the optical input unit,
wherein said circuit includes,
 a photo-detector for converting a received light pulse to a current pulse,
 a transimpedance amplifier, which receives the current pulse input converted by the photo-detector, for outputting a non-inverting voltage signal and an inverting voltage signal of the same amplitude.
 a peak detector connected to the transimpedance amplifier, for detecting a peak value of the non-inverting voltage signal from the transimpedance amplifier,
 a voltage signal generating circuit for generating two complemental voltage signals in accordance with an output signal from the peak detector and the inverting voltage signal and the non-inverting voltage signal from the transimpedance amplifier, the two complemental voltage signals each having a same amplitude and a cross point defined at halves of raising and falling edges of the two complemental voltage signals and shared by the two complemental voltage signals, and
 a discriminator for discriminating a potential of the cross point of the two complemental voltage signals and generating a square pulse signal with a logical level whose state is changed to another logical state in accordance with the potential of the cross point.

14. An optical data link device comprising:
an optical receiving module including an optical receiving circuit and a package in which the optical receiving circuit is hermetically sealed;
an optical transmitter module for transmitting an optical digital signal; and
optical fiber devices for connecting the optical receiver module and the optical transmitter module
wherein said circuit includes,
 a photo-detector for converting a received light pulse to a current pulse,
 a transimpedance amplifier, which receives the current pulse input converted by the photo-detector, for outputting a non-inverting voltage signal and an inverting voltage signal of the same amplitude.
 a peak detector connected to the transimpedance amplifier, for detecting a peak value of the non-inverting voltage signal from the transimpedance amplifier,
 a voltage signal generating circuit for generating two complemental voltage signals in accordance with an output signal from the peak detector and the inverting voltage signal and the non-inverting voltage signal from the transimpedance amplifier, the two complemental voltage signals each having a same amplitude and a cross point defined at halves of raising and falling edges of the two complemental voltage signals and shared by the two complemental voltage signals: and
 a discriminator for discriminating a potential of the cross point of the two complemental voltage signals and generating a square pulse signal with a logical level whose state is changed to another logical state in accordance with the potential of the cross point.

15. An optical data link device comprising:
an optical receiver module including an optical receiving circuit; an optical transmitter module for transmitting an optical digital signal; and
optical fiber devices for connecting the optical receiver module and the optical transmitter module
wherein said circuit includes,
 a photo-detector for converting a received light pulse to a current pulse,
 a transimpedance amplifier, which receives the current pulse input converted by the photo-detector, for outputting a non-inverting voltage signal and an inverting voltage signal of the same amplitude.

a peak detector connected to the transimpedance amplifier, for detecting a peak value of the non-inverting voltage signal from the transimpedance amplifier, a voltage signal generating circuit for generating two complemental voltage signals in accordance with an output signal from the peak detector and the inverting voltage signal and the non-inverting voltage signal from the transimpedance amplifier, the two complemental voltage signals each having a same amplitude and a cross point defined at halves of raising and falling edges of the two complemental voltage signals and shared by the two complemental voltage signals; and a discriminator for discriminating a potential of the cross point of the two complemental voltage signals and generating a square pulse signal with a logical level whose state is changed to another logical state in accordance with the potential of the cross point.

16. A receiving circuit comprising:

voltage signal output means, which receives a signal, for outputting a non-inverting voltage signal and an inverting voltage signal of the same amplitude;

a peak detector connected to the voltage signal output means, for detecting a peak value of the non-inverting voltage signal output from the voltage signal output means;

voltage signal generating means for generating two complemental voltage signals in accordance with an output signal from the peak detector and the inverting voltage signal and the non-inverting voltage signal from the transimpedance amplifier, the two complemental voltage signals each having a same amplitude and a cross point defined at halves of raising and falling edges of the two complemental voltage signals and shared by the two complemental voltage signals; and a discriminator for discriminating a potential of the cross point of the two complemental voltage signals and generating a square pulse signal with a logical level whose state is changed to another logical state in accordance with the potential of the cross point.

17. The receiving circuit according to claim 16, wherein the voltage signal output means comprise input means for inputting a voltage signal.

18. The receiving circuit according to claim 16, wherein the voltage signal output means comprise:

input means for inputting a voltage signal; and output means for outputting a non-inverting voltage signal and a inverting voltage signal of the same amplitude based on the voltage signal input by the input means.

19. The receiving circuit according to claim 16, wherein the voltage signal output means comprise:

converting means for converting a received signal to a voltage signal;

input means for inputting the voltage signal converted by the converting means; and output means for outputting a non-inverting voltage signal and an inverting phase voltage signal of the same level based on the voltage signal input by the input means.

20. The receiving circuit according to claim 16, wherein the voltage signal generating means comprise means for summing an output signal output from the peak detector, the non-inverting voltage signal output from the voltage signal output means and the inverting voltage signal output from the voltage signal output means, thereby generating two complemental voltage signals each having a same amplitude and a cross point crossed by the two complemental voltage signals.

21. The receiving circuit according to claim 16, wherein the discriminator includes a differential amplifier and the voltage signal generating means comprises first to fourth resistors respectively having resistances R1, R2, R3 and R4, wherein one end of the first resistor is connected to an output of the peak detector, one end of the second resistor is connected to the inverting voltage signal of the voltage signal output means, and both the other ends of the first and second resistors are applied to an inverting input terminal of the discriminator, and one end of the third resistor is connected to the non-inverting voltage signal of the voltage signal output means, one end of the fourth resistor is connected to the inverting voltage signal of the voltage signal output means, and both the other ends of the third and fourth resistors are applied to a non-inverting input terminal of the discriminator.

22. The receiving circuit according to claim 16, wherein the peak detector comprises a damping circuit for suppressing an of an output of the peak detector.

23. The receiving circuit according to claim 16, wherein the voltage signal output means comprises input means for inputting a current signal.

24. The receiving circuit according to claim 16, wherein the voltage signal output means comprises:

input means for inputting a current signal; end output means for outputting a non-inverting voltage signal and an inverting voltage signal of the same amplitude based on the current signal input by the input means.

25. The receiving circuit according to claim 16, wherein the voltage signal output means comprises:

converting means for converting a received signal to a current signal;

input means for inputting the voltage signal; and output means for outputting a non-inverting signal and an inverting phase voltage signal of the same level based on the current signal input by the input means.

* * * * *

UNITED STATES PATENT AND TRADEMARK OFFICE
CERTIFICATE OF CORRECTION

PATENT NO. : 5,777,507
DATED : July 7, 1998
INVENTOR(S) : Katsuji Kaminishi, et. al.

It is certified that error appears in the above-indentified patent and that said Letters Patent is hereby corrected as shown below:

Title Page, Item [57], in the Abstract, line 8, "make" should read --makes--.

Claim 1, Col. 12, line 42, "raising" should read --rising--.

Claim 12, Col. 13, line 50, "raising" should read --rising--.

Claim 13, Col. 14, line 13, "raising" should read --rising--.

Claim 14, Col. 14, line 47, "raising" should read --rising--.

Claim 15, Col. 15, line 11, "raising" should read --rising--.

Claim 16, Col. 15, line 34, "raising" should read --rising--.

Claim 2, Col. 12, line 51, "comprise" should read --comprises--.

Claim 3, Col.12, line 58, insert --of-- after "average".

UNITED STATES PATENT AND TRADEMARK OFFICE
CERTIFICATE OF CORRECTION

PATENT NO. : 5,777,507
DATED : July 7, 1998
INVENTOR(S) : Katsuji Kaminishi, et. al.

It is certified that error appears in the above-indentified patent and that said Letters Patent is hereby corrected as shown below:

Claim 5, Col.13, line 2, insert --of-- after "average".

Claim 4, Col. 12, line 62, "comprise" should read --comprises--.

Claim 9, Col. 13, line 21, "2R1=2R2=3R3=R4R" should read --2•R1=2•R2=3•R3=R4--.

Claim 18, Col. 15, line 49, "a" should read --an--.

Signed and Sealed this

Sixteenth Day of November, 1999

Attest:

Q. TODD DICKINSON

*Attesting Officer*     *Acting Commissioner of Patents and Trademarks*